United States Patent [19]
Underwood

[11] 3,828,260
[45] Aug. 6, 1974

[54] HEMATOCRIT MEASURING APPARATUS

[75] Inventor: Raymond D. Underwood, Saratoga, Calif.

[73] Assignee: Royco Instruments, Inc., Menlo Park, Calif.

[22] Filed: Apr. 2, 1973

[21] Appl. No.: 346,876

[52] U.S. Cl.......... 328/151, 235/92 PC, 235/151.34, 235/151.35, 307/235 A, 324/71 CP, 328/128, 328/183
[51] Int. Cl....................... G01n 27/02, H03k 5/153
[58] Field of Search..... 235/151.31, 151.34, 151.35, 235/92 PC; 307/227, 228, 235 A, 235 R; 324/71 R, 71 CP; 328/35, 122, 128, 151, 181, 183, 184, 186, 156, 157; 356/39, 40, 102

[56] References Cited
UNITED STATES PATENTS

| | | |
|---|---|---|
| 3,185,820 | 5/1965 | Williams et al. ........... 235/151.35 X |
| 3,313,924 | 4/1967 | Schulz et al. ............. 235/151.35 X |
| 3,439,267 | 4/1969 | Coulter et al................... 324/71 CP |
| 3,694,748 | 9/1972 | Hekimian......................... 328/151 X |
| 3,699,319 | 10/1972 | Berg............................. 235/151.34 |
| 3,701,909 | 10/1972 | Holmes et al................... 328/151 X |
| 3,733,547 | 5/1973 | Coulter et al............... 235/92 CP X |
| 3,757,213 | 9/1973 | Coulter et al............... 235/92 PC X |

Primary Examiner—Rudolph V. Rolinec
Assistant Examiner—L. N. Anagnos
Attorney, Agent, or Firm—Flehr, Hohbach, Test, Albritton & Herbert

[57] ABSTRACT

A hematocrit measuring apparatus processes pulses whose amplitude represents blood cell volume by a two stage analog storage process where peak pulse amplitudes are sequentially detected by the first stage and thereafter summed in the second stage. Noise immunity is also provided by a pulse height discriminator which enables the transfer between stages.

1 Claim, 4 Drawing Figures

HEMATOCRIT MEASURING APPARATUS

BACKGROUND OF THE INVENTION

This invention relates generally to apparatus for measuring hematocrit and more particularly to apparatus for providing automatic determination of such value.

The hematocrit of blood is the ratio of total volume of the red cells of the given sample of whole blood to the total volume of that sample, normally expressed as a percentage. This index is extremely useful in diagnostic studies and treatment of diseases whose symptoms and manifestations may include physical changes in the blood. Previous automatic measuring techniques are shown in Coulter U.S. Pat. No. 3,439,267 and Berg U.S. Pat. No. 3,699,319. Both of these patents and for that matter the present invention utilize apparatus where a suspension of the blood in some dilutent is passed through an orifice of microscopic dimensions. The dilutent is a buffered electrolyte. Each time a cell traverses the orifice there is a change in the electrical impedance of the dilutent which is within the orifice. This change is used to provide an electrical pulse type signal whose amplitude is proportional to the actual cell volume and whose duration is equal to the time that the cell is passing through the sensing zone represented by the effective orifice. The Berg patent states that prior art techniques were defective in that pulses were operated upon, for example, by shaping to provide an integrated charge on a capacitor which is utilized to operate a motor mechanism for a scale pointer and that such procedure suffers from analog component stability and from changes in ambient conditions. The Berg patent suggests a digital technique where each pulse representing the volume of a single blood cell is digitized and thereafter accumulated. The Berg patent also provides for both lower and upper threshold level devices to eliminate ambient noise and extraneous signals.

While a digital device has perhaps somewhat better accuracy its cost may be excessive and also its speed somewhat slower than desirable in many circumstances due to the necessity of digitizing every pulse from the cell apparatus.

OBJECT AND SUMMARY OF THE INVENTION

It is, therefore, an object of the present invention to provide an improved hematocrit measuring apparatus.

In accordance with the above object there is provided a hematocrit measuring apparatus comprising cell sizing apparatus for producing over a measurement period electrical pulses having amplitudes directly proportional to the volume of individual cells. The pulses have leading and trailing edges. Means for summing the amplitudes of all of the pulses during the measurement period include first storage means responsive to the leading pulse edges for sequentially storing the amplitudes of the pulses. Second storage means are coupled to the first storage means for accumulating the sequentially stored amplitudes of the first storage means. Means are responsive to the trailing edges of the pulses for transferring the stored amplitudes of the first storage means to the second storage means.

DETAILED DESCRIPTION OF THE PREFERRED EMBODIMENT

Figure 1:
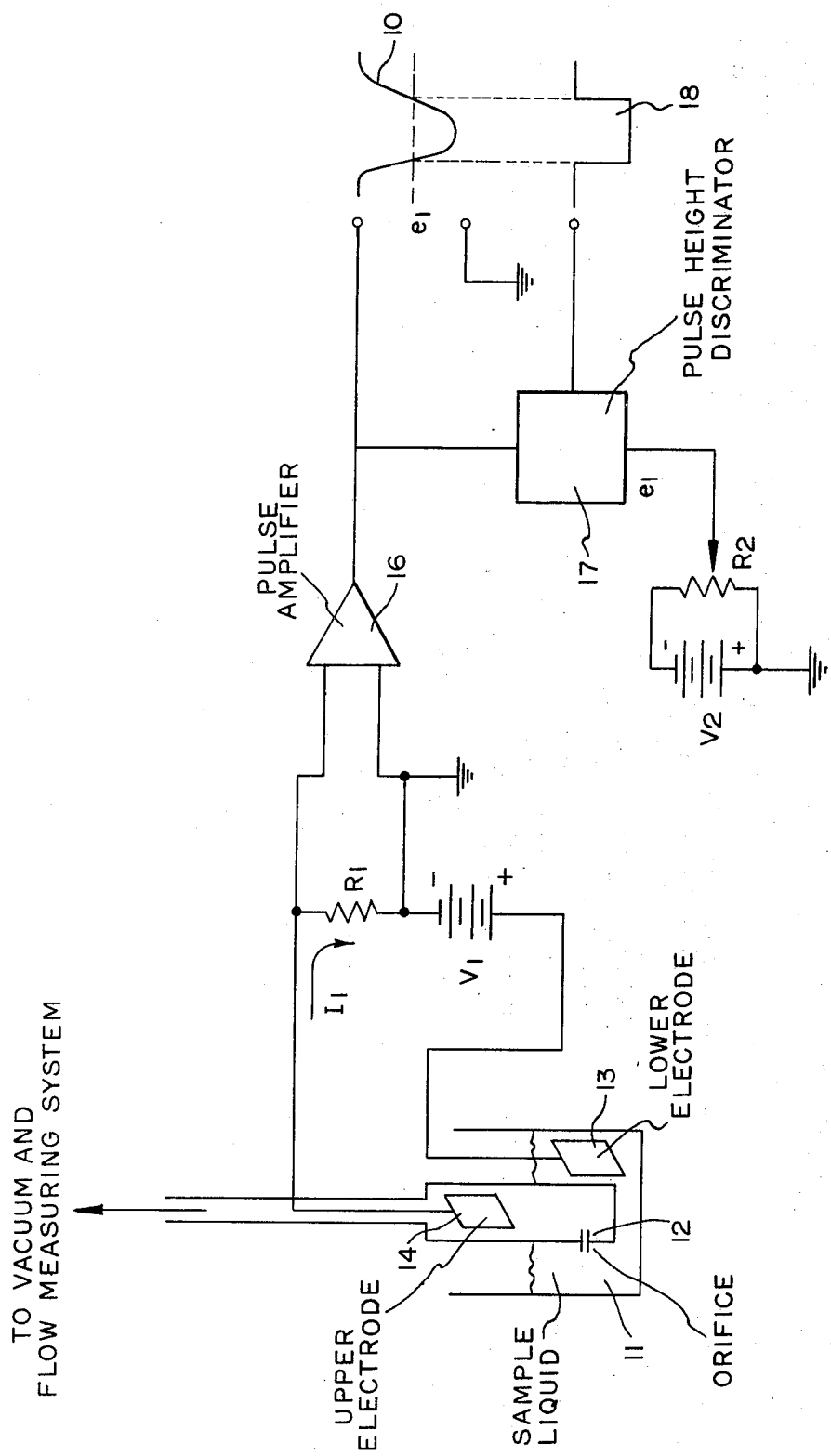
FIG. 1 is a circuit block diagram of apparatus used in conjunction with the present invention.

FIG. 1 illustrates a typical pulse generating apparatus for producing a train of pulses 10 which have amplitudes directly proportional to the volume of individual blood cells contained in the sample liquid 11. The blood sample to be assayed is mixed in an electrically conductive liquid such as a saline. During a measurement cycle to produce a single pulse 10, a fixed volume of the sample liquid is forced by atmospheric pressure to flow through orifice 12. The voltage source V1 causes the current $I_1$ to flow from the lower electrode 13 through the orifice and then to the upper electrode 14 and through $R_1$ as indicated. Thus, as the nonconductive blood cells pass through the orifice, the circuit impedance increases causing the change in the value $I_1$. For each blood cell passing through the orifice 12 the pulse amplifier 16 will output a pulse 10 whose amplitude is proportional to the ratio of the blood cell volume to the orifice volume.

In order to differentiate between pulses due to blood cells and lower amplitude pulses due to platelets and system noise a pulse height discriminator 17 is provided which produces an output pulse 18 only during the period when the amplitude of pulse 10 exceeds a predetermined reference level, $e_1$. This is set by the potentiometer R2 which is supplied by voltage source $V_2$. As thus far described, such apparatus is known in the art.

Figure 2:
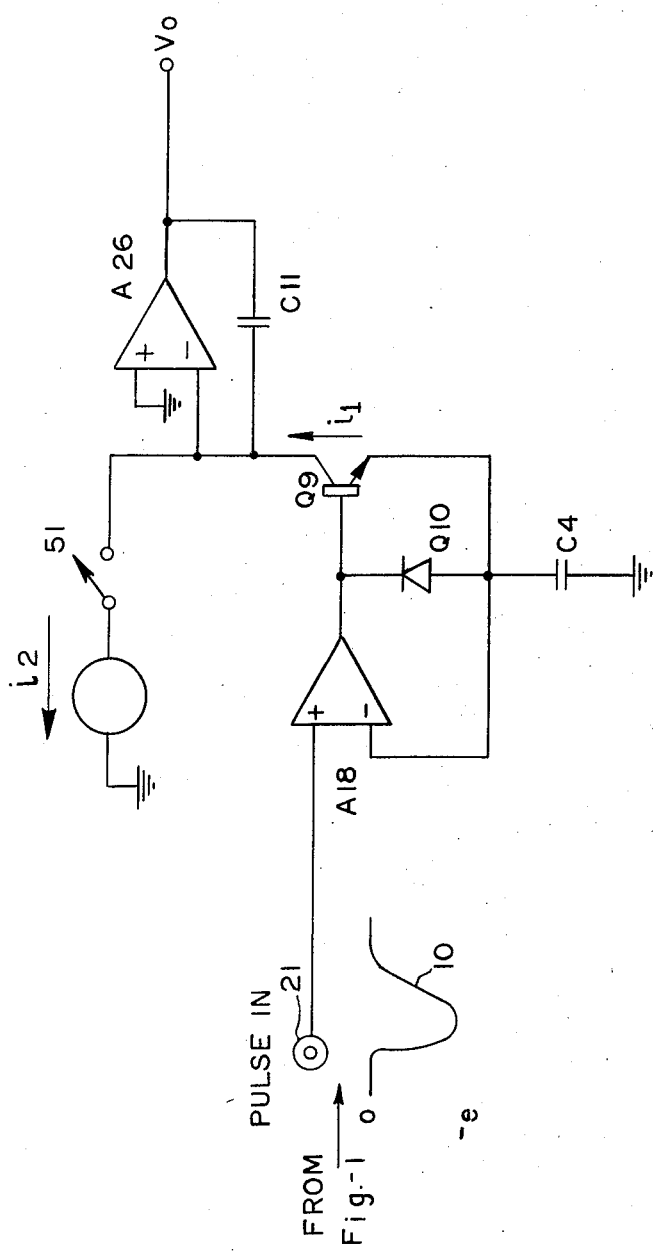
FIG. 2 is a simplified block diagram of apparatus embodying the present invention.

As illustrated in FIG. 2 the pulse 10 is coupled on an input terminal 21 to the operational amplifier A18. The circuit also includes an operational amplifier A26. Such operational amplifiers are considered to be ideal with no offset voltage and infinite bandwidth and gain. The transistor Q9 is also considered to be an ideal transistor with infinite beta.

In operation, initially the switch S1 is open disconnecting the current source $I_2$ from the circuit and the capacitor C4 and C11 are uncharged. When a negative input pulse 10 occurs at input jack 21 the output of amplifier A18 swings in a negative direction thus turning the diode designated Q10 on and charging capacitor C4 to the input pulse peak amplitude. In other words, C4, Q10, and A18 are a part of first storage means responsive to the leading pulse edge of pulse 10 for storing the amplitude of a single pulse.

On the trailing edge of pulse 10 or as the pulse waveform becomes positive after the peak, the output of amplifier A18 also swings positive, thus turning off Q10 to stop the charging of C4 and Q10 forward biasing the base emitter junction of transistor Q9. Q9 then couples capacitor C11 to capacitor C4 to allow the charge to be transferred between the two capacitors. Amplifier A26 along with capacitor C11 performs the function of an operational or Miller integrator. The current $I_1$ flowing into capacitor C11 from capacitor C4 causes a net increase of charge on C11 and thus an output voltage $V_0$. Moreover, since capacitor C4 was charged to the peak of the input signal the output voltage $V_0$ will be equal to the peak input signal multiplied by the ratio C4/C11. This process is repeated for each negative input pulse received. Thus, capacitor C11 is a portion of second storage means which are coupled to the first storage means for accumulating the sequentially stored amplitudes of capacitor C4. At the end of a measurement period, the charge on capacitor C11 will produce an output voltage $V_0$ which is directly proportional to the total blood cell volume in the sample.

Output voltage $V_0$ may be measured by any number of means one of which is a digital voltmeter or other appropriate analog to digital converters. At the end of the measurement period switch S1 may be closed to allow the discharge of capacitor C11. If the discharge current $I_2$ is constant, the length of time required to discharge C11 and return $V_0$ to a zero voltage will be directly proportional to the value of $V_0$. As will be discussed in conjunction with FIGS. 3 and 4 the foregoing is utilized to provide an analog to digital conversion of the voltage $V_0$.

Thus, FIG. 2 illustrates a two stage charging process which is analog in nature but which provides good stability.

Figure 3:
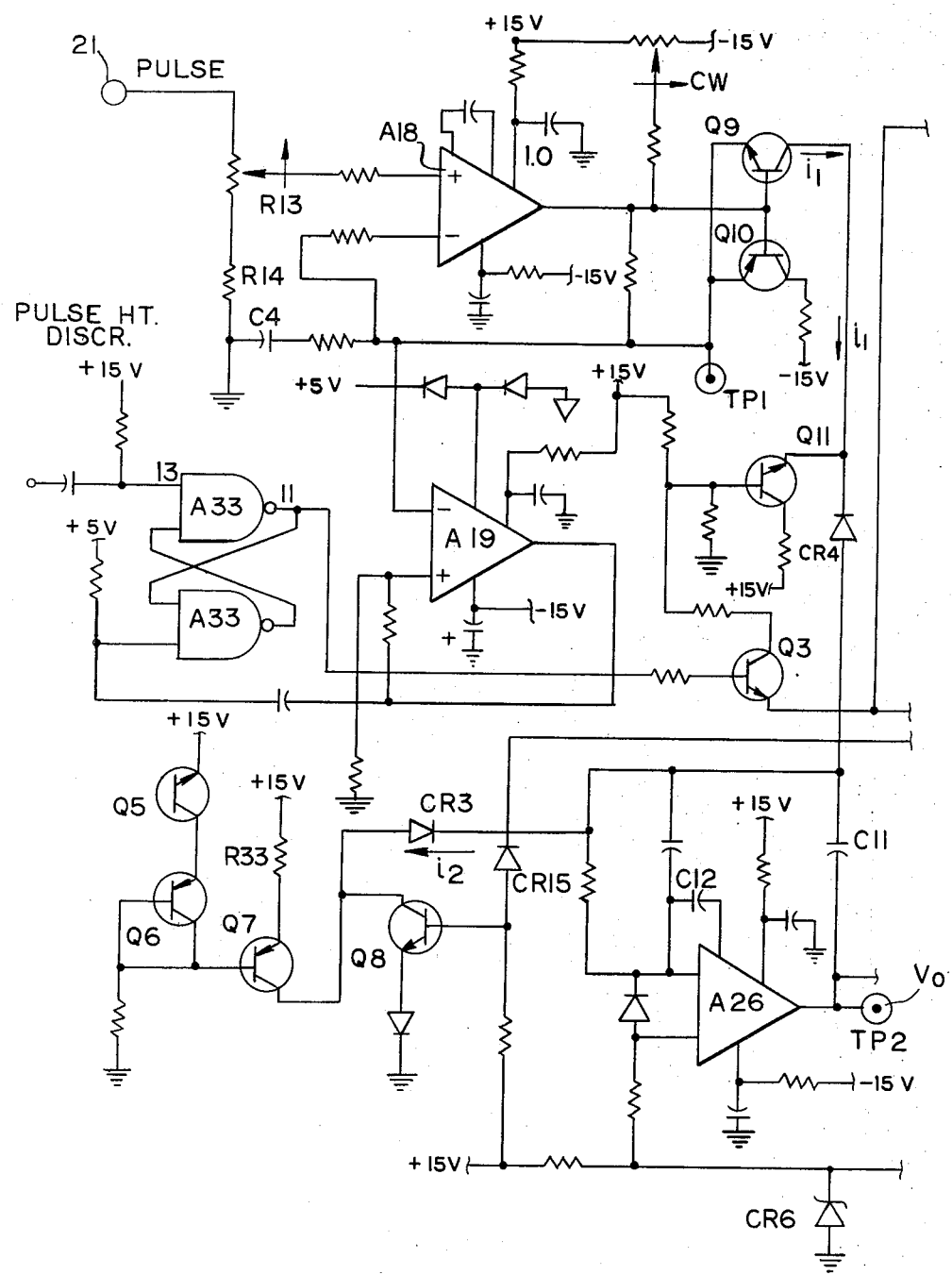
FIGS. 3 and 4 show a detailed circuit schematic of FIG. 2.
Figure 4:
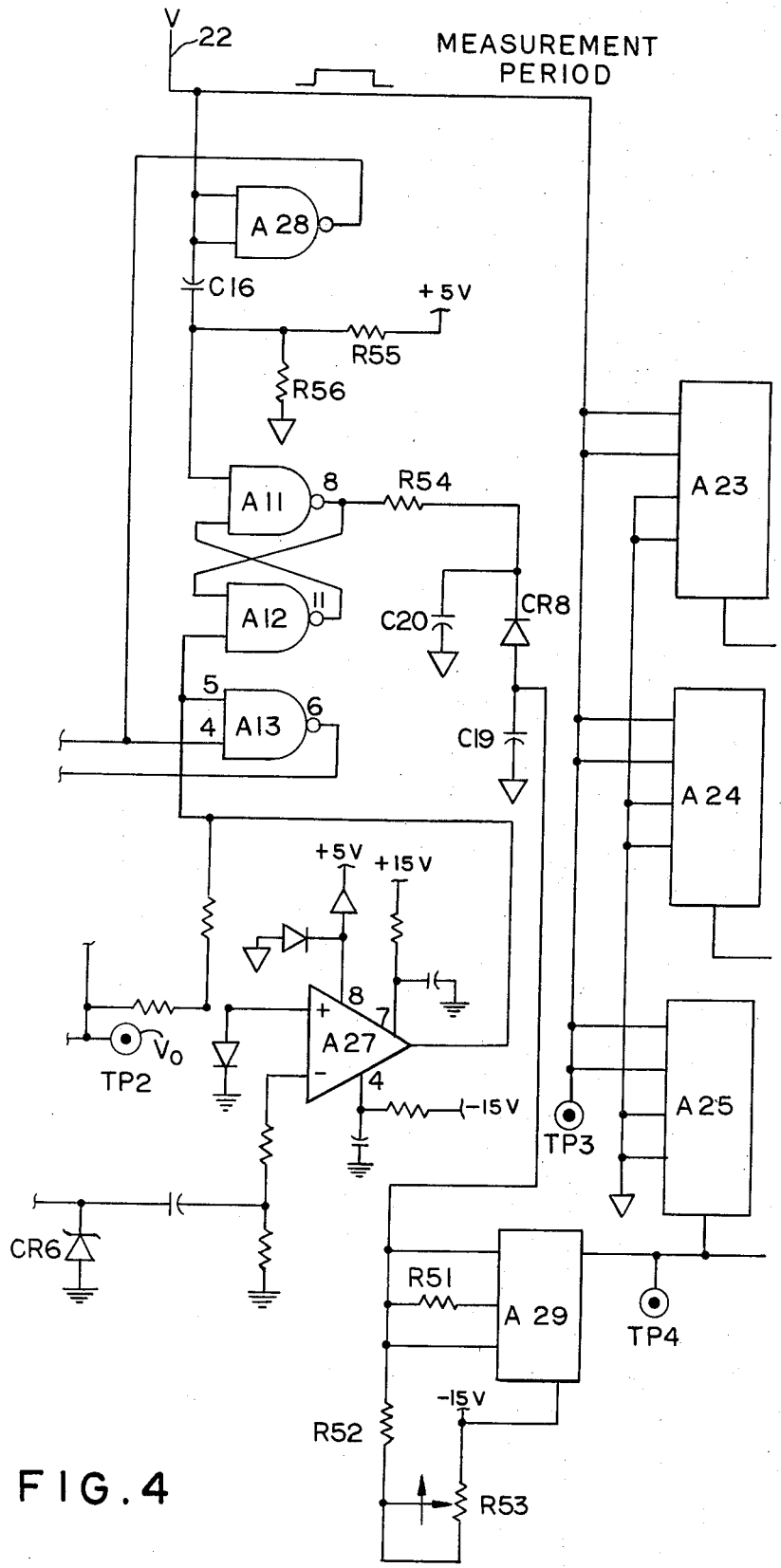

Referring now to the detailed circuit schematic of FIGS. 3 and 4 the negative imput pulses 10 are received on input terminal 21 are impressed across the voltage divider consisting of R13 and R14. R13 is a potentiometer which is used to adjust the gain of the apparatus. This is coupled to operational amplifier A18 which was discussed in conjunction with FIG. 1. Amplifier A18 along with transistor Q10 and capacitor C4 form the negative peak detector or first storage means of FIG. 2. Transistor Q10 is used in place of a diode to increase the current available to charge capacitor C4 thus making the circuit more responsive to fast rise time pulses. The output of operational amplifier A18 is, of course, coupled to both the base of transistor Q10 and Q9. Q9 serves as a transfer switch for coupling capacitor C4 to the capacitor C11 which forms part of a Miller integrator circuit which also includes amplifier A26. The output of amplifier A26 is, of course, the voltage $V_0$.

The constant current source which generates $I_2$ as discussed in FIG. 2 and which discharges capacitor C11 or resets the Miller integrator to 0 at the end of the measurement period is a group of transistors Q5, Q6, Q7 along with a resistor R33 which provides a constant one millampere current. This current flows either through transistor Q8 to ground when it is disconnected from capacitor C11 or through the diode CR3 to C11. Thus, the base input to transistor Q8 in equivalent to the switch S1 of FIG. 2.

The diode CR4 between the transistor switch Q9 and capacitor C11 serves as a gate which is opened and closed by the pulse 18 produced by pulse height discriminator 17 of FIG. 1. Such pulse height discriminator signal 18 is normally a logic high. NAND gates A33 form a set-reset multivibrator with output pin 11 normally in the logic low state, thus turning off transistor Q3 and allowing the voltage at the base of the transistor Q11 to rise to +10 volts. This positive base voltage turns on transistor Q11 and reverse biases the diode CR4 thus ensuring that any small noise pulses that are recieved and stored in capacitor C4 are not transferred and stored in memory capacitor C11.

However, when a blood cell is detected and the amplitude of pulse 10 exceeds the reference level to thereby provide an output pulse 18 from pulse height discriminator 17, the signal at A33 pin 13 swings negative which causes its output, pin 11, to rise to a logic high state. This in turn forward biases the base emitter junction of Q3 lowering the base voltage of Q11. The anode voltage of CR4 is approximately +7 volts and is set by the operation of the Miller integrator A26 and Zener diode CR6. As the base of the transistor Q11 drops below 7 volts, Q11 will be turned off and diode CR4 forward biased. When switch Q9 is closed by the trailing edge action discussed above of amplifier A18, the discharge current $I_1$, from C4 will flow into memory capacitor C11. When all of the charge on C4 has been transfered to C11, the voltage on C4 will again be zero. Amplifier A19 forms a zero detector which resets A33 to the quiescent state with diode CR4 reverse biased. In this manner, only the pulses due to blood cells passing through the orifice are stored and summed in capacitor C11. Moreover, it is apparent that with the use of a two stage storage process, where charge is transferred on the trailing edge of the input pulse, that sufficient time is provided for a noise rejection signal.

The foregoing process is repeated so that the voltage at $V_0$ or TP2 is approximately +5 volts for a 50% hematocrit. This analog voltage is converted to a digital output through decade counters A23, A24, and A25 in the following manner.

The measurement period is indicated on the line 22 by a measurement pulse whose generation is well known in the art. At the beginning of the measurement period the pulse level goes high and at the end it goes low. This latter action removes the reset command from the A23, A24 and A25 counters. The negative transition is also differentiated by capacitor C16 and resistors R55 and R56 to "set" the multivibrator consisting of cross-coupled units A11 and A12. This "set" condition of the multivibrator results in the pin 8 going to a logic high condition. When this occurs, there is a positive signal coupled through diode CR8, with a slight delay due to R54 and C20 to an oscillator consisting of A29, capacitor C19 and in the resistive network of R51, R52 and R53. The oscillator produces negative pulses at approximately a 10kHz rate at test point 4, TP4, which is coupled to the input of the first decade counter A25. The negative transition of the measurement period pulse on line 22 also results in the emitter of Q3 going to a logic high level due to the gate unit A28 thus ensuring that Q3 cannot be turned on and that the analog gate of Q11 and CR4 remain closed.

Amplifier A27 serves as a zero detector which detects when the output $V_0$ of Miller integrator A26 passes through 0 volts. As discussed above if the discharge current $I_2$ is constant, then the length of time required to discharge C11 from $V_0$ to 0 will be directly proportional to the value of $V_0$. The positive output of zero detector A27 is coupled to pin 5 of gate A13 which also has a positive input on pin 4 from gate A28. This creates a low logic level on the output of A13 or pin 6 which forward biases diode CR15. Transistor Q8 is turned off (in other words, switch S1 is closed) to cause the constant current source $I_2$ to withdraw current from discharge capacitor C11 through diode CR3. Thus, the voltage $V_0$ of the Miller integrator decreases linearly with time towards 0 volts. As the output voltage $V_0$ passes through 0 the amplifier A27 will switch to its low output state which forces pin 6 of A13 to go high, turning on transistor Q8 and diverting the constant current source current $I_2$ to ground. As zero detector A27 goes low it sets flip-flop A11, 12 to thus terminate the operation of oscillator A29. Since the Miller integrator has been discharged linearly with time, and since the oscillator A29 has been producing a constant frequency into the decade dividers A23, A24 and A25, the number of pulses in these dividers is directly proportional to the value of the Miller integrator voltage at the end of the measurement period. Thus, the number appearing in the decade counter is directly proportional to the total blood cell volume in a given sample and thus directly proportional to hematocrit.

I claim:

1. Hematocrit measuring apparatus comprising: cell sizing apparatus for producing over a measurement period electrical pulses having amplitudes directly proportional to the volume of individual cells said pulses having leading and trailing edges; means for summing the amplitudes of all of said pulses during said measurement period including first storage means responsive to said leading pulse edge for sequentially storing the amplitudes of said pulses, second storage means coupled to said first storage means for accumulating said sequentially stored amplitudes of said first storage means, means responsive to said trailing edges of said pulses for transferring said stored amplitudes of said first storage means to said second storage means said transferring means including a first transistor for providing a charge transfer path from said first storage means to said second storage means said first storage means including an operational amplifier, a second transistor, and a capacitor, the base of said second transistor being coupled to the output of said amplifier so that the leading edge of a pulse places said second transistor in a conductive condition to charge said capacitor to the peak amplitude of said pulse, said output of said amplifier switching polarity in response to said trailing edge of said pulse for turning off said second transistor and turning on said first transistor whose base is coupled to said output.

* * * * *